United States Patent
Case

(10) Patent No.: US 9,491,951 B2
(45) Date of Patent: Nov. 15, 2016

(54) REFRACTORY COOKING DEVICES

(71) Applicant: Timothy M. Case, Mission Viejo, CA (US)

(72) Inventor: Timothy M. Case, Mission Viejo, CA (US)

(73) Assignee: Timothy M. Case, Mission Viejo, CA (US)

(*) Notice: Subject to any disclaimer, the term of this patent is extended or adjusted under 35 U.S.C. 154(b) by 456 days.

(21) Appl. No.: 13/941,176

(22) Filed: Jul. 12, 2013

(65) Prior Publication Data

US 2014/0014086 A1   Jan. 16, 2014

Related U.S. Application Data

(60) Provisional application No. 61/671,725, filed on Jul. 14, 2012.

(51) Int. Cl.
*A21B 1/00* (2006.01)
*A47J 37/07* (2006.01)
(Continued)

(52) U.S. Cl.
CPC .............. *A21B 1/00* (2013.01); *A47J 37/0658* (2013.01); *A47J 37/0704* (2013.01);
(Continued)

(58) Field of Classification Search
CPC .................................. A21B 1/00; F24B 1/003
See application file for complete search history.

(56) References Cited

U.S. PATENT DOCUMENTS 3,266,483 A    8/1966   Keel
3,270,740 A *   9/1966   Koos, Jr. ................. A47J 37/01
                                                                    126/275 R (Continued)

FOREIGN PATENT DOCUMENTS

AU      2009202581 A1    1/2010
CN          1989888 A    7/2007

(Continued)

OTHER PUBLICATIONS

International Search Report dated Oct. 10, 2013 as received in Application No. PCT/US2013/050350.
(Continued)

*Primary Examiner* — Kenneth Rinehart
*Assistant Examiner* — Logan Jones
(74) *Attorney, Agent, or Firm* — Maschoff Brennan

(57) ABSTRACT

A cooking device may include a refractory oven and a housing. The refractory oven may define a cooking chamber that may be configured to receive thermal energy from an external heat source. The refractory oven may further define an opening configured to allow foodstuffs to be introduced into the cooking chamber. The refractory oven may be further configured to substantially surround the foodstuffs while the foodstuffs are positioned inside the cooking chamber. The housing may at least partially surround the refractory oven. The housing and the refractory oven may define a heated volume between an external surface of the refractory oven and an internal surface of the housing. The heated volume may be configured to receive thermal energy from the external heat source and to reduce transfer of thermal energy from the cooking chamber through refractory oven.

18 Claims, 13 Drawing Sheets

(51) Int. Cl.
  *A47J 37/06* (2006.01)
  *F24B 1/00* (2006.01)
(52) U.S. Cl.
  CPC .......... *A47J 37/0759* (2013.01); *A47J 37/0786* (2013.01); *F24B 1/003* (2013.01)

(56) References Cited

U.S. PATENT DOCUMENTS

| | | | |
|---|---|---|---|
| 3,786,741 A | 1/1974 | Plumley et al. | |
| 3,791,370 A | 2/1974 | Fauser | |
| 4,108,138 A * | 8/1978 | Petin | F24B 1/20 126/19 R |
| 4,800,865 A * | 1/1989 | Setzer | F24B 1/003 126/21 R |
| 5,195,425 A * | 3/1993 | Koziol | A47J 37/0786 126/41 R |
| 5,413,033 A * | 5/1995 | Riccio | A21B 1/02 126/19 R |
| 6,041,769 A * | 3/2000 | Llodra, Jr. | A47J 37/0759 126/197 |
| 6,101,930 A * | 8/2000 | Van Over | F24C 15/16 126/12 |
| 6,187,359 B1 * | 2/2001 | Zuccarini | A47J 37/01 126/25 R |
| 6,307,185 B1 * | 10/2001 | Loveless | F24C 7/10 219/399 |
| 6,640,695 B2 | 11/2003 | Stark | |
| 6,951,214 B2 | 10/2005 | Beech | |
| 7,219,663 B2 * | 5/2007 | Cuomo | A47J 36/36 126/25 R |
| 7,686,010 B2 * | 3/2010 | Gustavsen | F24B 1/003 126/25 R |
| 2002/0017290 A1 * | 2/2002 | Hines, Jr. | A47J 37/01 126/41 R |
| 2004/0216732 A1 * | 11/2004 | McFadden | A21B 1/245 126/21 A |
| 2006/0102167 A1 * | 5/2006 | Driscoll, Jr. | A47J 37/0623 126/275 R |
| 2006/0191528 A1 | 8/2006 | Spangrud | |
| 2006/0225727 A1 | 10/2006 | Kim et al. | |
| 2008/0149089 A1 | 6/2008 | Karabin et al. | |
| 2008/0296284 A1 | 12/2008 | McFadden et al. | |
| 2009/0020111 A1 * | 1/2009 | Immordino | F24B 1/202 126/9 R |
| 2009/0272728 A1 * | 11/2009 | Abbott | F24C 7/04 219/399 |
| 2010/0124596 A1 * | 5/2010 | Nelson | A23L 1/0128 426/523 |
| 2010/0147281 A1 * | 6/2010 | Gustavsen | F24B 1/003 126/21 A |
| 2011/0214662 A1 * | 9/2011 | Contarino, Jr. | A47J 37/07 126/25 R |
| 2014/0000585 A1 | 1/2014 | Touma | |

FOREIGN PATENT DOCUMENTS

| | | |
|---|---|---|
| CN | 100424422 C | 10/2008 |
| EP | 2 103 878 A1 | 9/2009 |
| FR | 2468839 A1 | 5/1981 |
| JP | 2006102488 A | 4/2006 |
| WO | 2006099034 A1 | 9/2006 |
| WO | WO2012/131333 | 11/2012 |

OTHER PUBLICATIONS

Written Opinion of the International Searching Authority dated Oct. 10, 2013 as received in Application No. PCT/US2013/050350.
Brad English, *A Brick Wood/Gas Grill Oven Project*, Pizza Quest With Peter Reinhart, Sep. 6, 2011, http://www.fornobravo.com/pizzaquest/instructionals/59-written-recipes/278-a-brick-woodgas-grill-oven-project.html.
Michael A. Carlin & Christopher C. Poirier, *A Novel, Portable Brick Pizza Oven*, Pencil in My Pocket Pizza—P³, http://ccpoirier.com/wordpress/wp-content/uploads/2009/10/oven.pdf.
tdjtx, *Homemade Brick Oven Pizza—on a gas grill*, YouTube, Sep. 15, 2012, http://www.youtube.com/watch?v=11O1x4bdpC0, also available at http://chinohillspizzaria.com/homemade-brick-oven-pizza-gas-grill.
Al Contarino, www.kettlepizza—*turn Your Kettle Grill into an Outdoor Pizza . . .* , YouTube, May 10, 2012, http://www.youtube.com/watch?v=DBVYmtn5jxw&list=PL9FC8B951BEA7CBB9 &index=1, also available at http://www.kettlepizza.com/.
Pizza Que Grill Stone, William-Sonoma, http://www.williams-sonoma.com/products/pizza-que-grill-stone/.
BBQ Pizza Pan, Eastman Outdoors, http://www.eastmanoutdoors.com/bbq-pizza-pan-.
grillgrate, *10-Minute BBQ Pizza*, YouTube, Jul. 12, 2011, http://www.youtube.com/watch?v=lrxQB0OPqKw, also available at: http://www.grillgrate.com/index/php?/site/pizza_lovers.
Pizza Oven, Beef Eater, http://www.beefeaterbbq.com/pizza-oven/pizza-oven-29710/w1/i1286319_1286316/.
Kristian Tapaninaho, *Uuni—a small, fast & affordable wood-fired pizza oven*, Kickstarter, Nov. 15, 2012, http://www.kickstarter.com/projects/tapaninaho/uuni-a-small-fast-and-affordable-wood-fired-pizza.
Owner's Manual Blackstone Patio Oven Model # 1575, Blackstone, available at: http://www.blackstoneproducts.com/prodinfo/pizzaoven.html.
Kalamazoo, Artisan Fire Pizza Oven, http://kalamazoogourmet.com/products/artisan-fire-pizza-oven/.
Alfa Pizza, *Alfa Pizza Spot TV 2013 60"*, YouTube, Apr. 2, 2013, http://www.youtube.com/watch?v=Ebo6wC7Ufcl &feature=player_embedded#at=24 , also available at: http://www.alfapizza.it/?lang=en.
Chadwick Oven, Chadwick, http://chadwickoven.com/order-today.
Sue Bradley, *Daniel Chadwick sets the world alight with his new pizza oven*, Gloucestershire Echo, Apr. 2, 2013, http://www.thisisgloucestershire.co.uk/Daniel-Chadwick-sets-world-alight-new-pizza-oven/story-18586967-detail/story.html#axzz2ZiHkV87L.
Weber, Weber Original Charcoal Pizza Oven, http://www.weberbbq.co.uk/product/weber-original-charcoal-pizza-oven/.
Mighty Pizza Oven, *Bake Pro-quality pizzas in 3-5 minutes on your backyard grill!*, YouTube, Jun. 30, 2013, http://www.youtube.com/watch?v=29vLuY7Z_Qs, also available at: http://www.mightypizzaoven.com/.
2Stone, *2stone Pizza Grill*, 2Stone, http://www.2stonepg.com/2stone-pizza-gril.html.
sportsmansnewstv, *Sportsman's News VPR—Camp Chef Italia*, YouTube , Apr. 29, 2013, http://www.youtube.com/watch?v=XCRXIQAbVxg &list=PLe0LNMHCof3j8oPm3A4dNkGjF8494DNiJ &feature=player_embedded.
campchef, *Camp Chef Italia Artisan Pizza Oven Overview*, YouTube, Apr. 15, 2013, http://www.youtube.com/watch?v=PgP-cpSSTQc &list=PLe0LNMHCof3j8oPm3A4dNkGjF8494DNiJ#at=39, also available at http://www.campchef.com/cooking-accessories/bbq-grill-boxes/italia-artisan-pizza-oven-pz90.html.
Chinese Office Action and Search Report mailed Dec. 30, 2015 for Chinese Patent Application No. 201380042951.9 filed Jul. 12, 2013.
Supplementary European Search Report mailed Mar. 9, 2016 for European Application No. 13819686.0.
"BakerStone—The Brick Oven Box Project", Dec. 8, 2012, Retrieved from the Internet: http://web.archive.org/web/20121208010458/http://www.bakerstonebox.com/, retrieved Jun. 21, 2016.

* cited by examiner

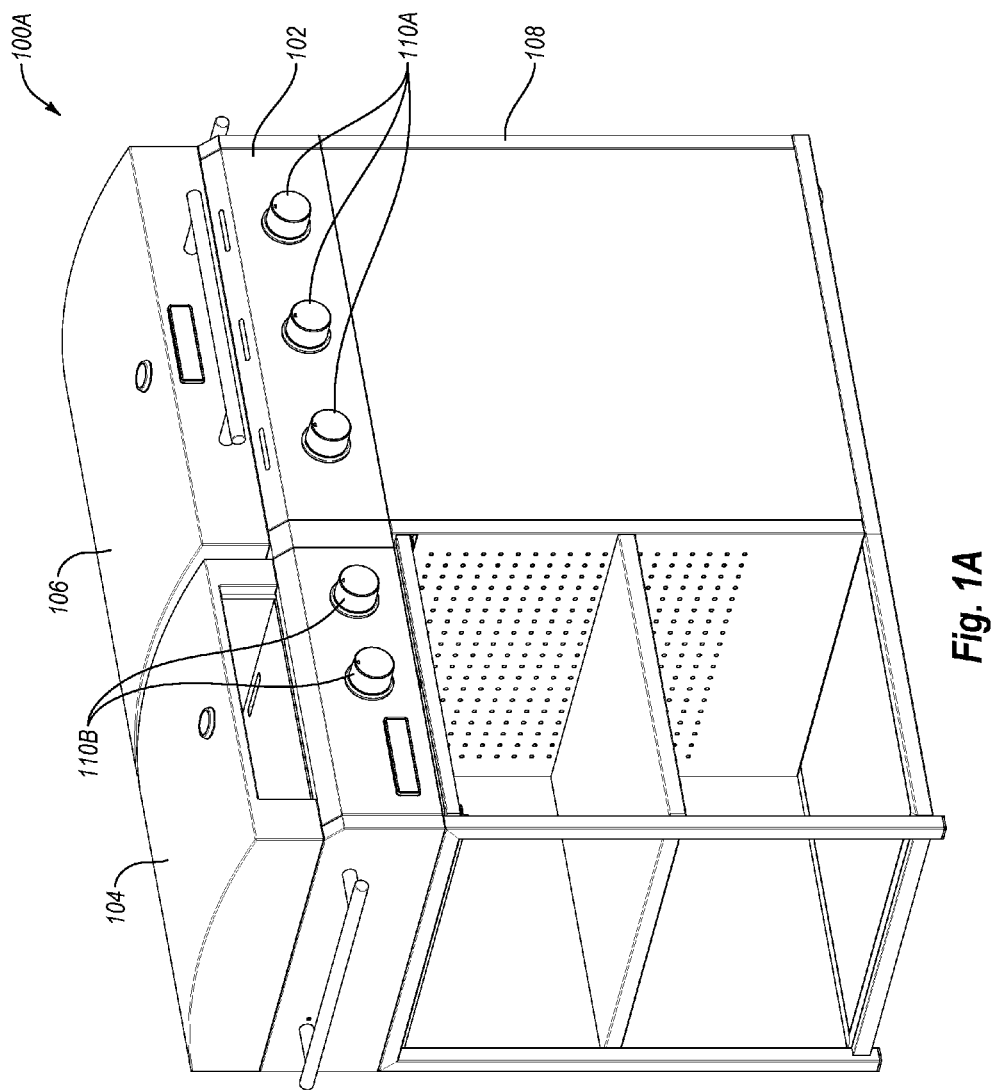

REFRACTORY COOKING DEVICES

CROSS-REFERENCE TO RELATED APPLICATIONS

This patent application claims the benefit of and priority to U.S. Provisional Patent Application No. 61/671,725, filed Jul. 14, 2012, which is incorporated herein by reference in its entirety.

FIELD

The embodiments discussed herein are related to refractory cooking devices.

BACKGROUND

Properly cooking certain foods may include the introduction of the foods into a high-heat environment for a short period. By applying the high-heat for the short period, specific characteristics of the food may be achieved. For example, properly cooking a New York style pizza and/or a Neapolitan style pizza may include introducing an uncooked pizza into an oven with a temperature between about 600 degrees Fahrenheit (F) and about 1100 degrees F. for between three and six minutes. The high-heat environment may scorch the crust of the pizza while simultaneously heating toppings and melting cheese.

However, creating a high-heat environment is difficult, expensive, and inefficient in residential and small-scale situations. Typically, high-heat environments are produced in large ovens that may cost thousands of dollars and may occupy large spaces. The large ovens may inefficiently consume fuel during the heating and lose much of the heat following use. Additionally, cooking using the large oven may involve learning "hot spots" and "cool spots" which may be geometrically or environmentally determined.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a cooking device is disclosed. The cooking device may include a refractory oven and a housing. The refractory oven may define a cooking chamber that may be configured to receive thermal energy from an external heat source. The refractory oven may further define an opening configured to allow foodstuffs to be introduced into the cooking chamber. The refractory oven may be further configured to substantially surround the foodstuffs while the foodstuffs are positioned inside the cooking chamber. The housing may at least partially surround the refractory oven. The housing and the refractory oven may define a heated volume between an external surface of the refractory oven and an internal surface of the housing. The heated volume may be configured to receive thermal energy from the external heat source and to reduce transfer of thermal energy from the cooking chamber through the refractory oven.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 1A and 1B illustrate example cooking systems;

DESCRIPTION OF SOME EXAMPLE EMBODIMENTS

Some embodiments discussed herein are related to refractory cooking devices. An example embodiment includes a cooking device that may include a refractory oven and a housing. The refractory oven may define a cooking chamber that may be configured to receive thermal energy from an external heat source. The cooking device may create a high-heat environment that may be suitable to cook foodstuffs such as New York style pizza Neapolitan style pizza, steaks, casseroles, cookies, cakes, etc. As used herein, high-heat may generally refer to an environment having a temperature between about 600 degrees Fahrenheit (F) and about 1100 degrees F.

The refractory oven may also define an opening and a vent. The opening may be configured to allow foodstuffs to be introduced into the cooking chamber. The refractory oven may be configured to absorb thermal energy received from the external heat source and transfer the thermal energy to foodstuffs in contact with a cooking surface of the refractory oven via thermal conduction. The refractory oven may be configured to absorb the thermal energy and transfer the thermal energy to the foodstuffs via thermal radiation. Additionally, the vent and the opening may be configured to allow the thermal energy from the external heat source to enter the cooking chamber through the vent. The thermal energy is then transferred to the foodstuffs via thermal convection.

The housing may at least partially surround the refractory oven. The housing and the refractory oven may define a heated volume between an external surface of the refractory oven and an internal surface of the housing. The heated volume may be configured to receive thermal energy from the external heat source and to reduce transfer of thermal energy from the cooking chamber through the refractory oven. Some additional embodiments will be explained with reference to the accompanying drawings in which like item numbers indicate like structures.

Figure 1B:
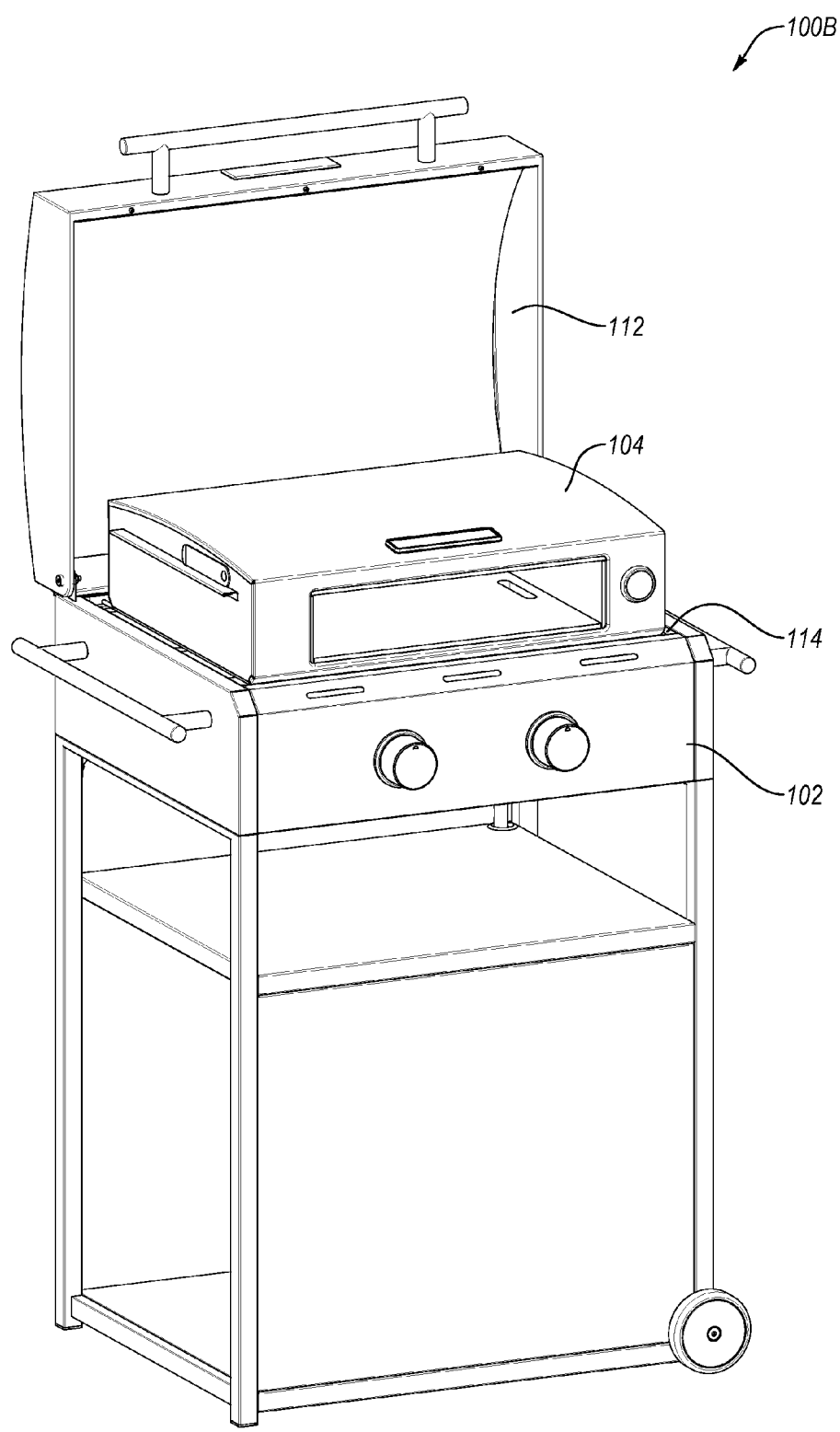

FIGS. 1A and 1B illustrate example cooking systems 100A and 100B in accordance with at least one embodiment described herein. The cooking systems 100A and 100B may include an external heat source 102 that may be configured to produce thermal energy that may be received by a cooking device 104. Generally, the cooking device 104 may be configured to be positioned relative to the external heat source 102 such that the thermal energy produced by the external heat source 102 may be received by the cooking device 104. The cooking device 104 may be configured to then transfer the thermal energy to foodstuffs positioned inside the cooking device 104. Thus, the cooking device 104 may use the thermal energy produced by the external heat source 102 to create a high-heat environment.

In the cooking systems 100A and 100B, the cooking device 104 may be positioned on top of or generally above the external heat source 102. The thermal energy produced by the external heat source 102 may accordingly heat a bottom portion of the cooking device 104. In some alternative embodiments, the cooking device 104 may be positioned to the side of, in front of, below, or within the external heat source 102. In these embodiments, the cooking device 104 may receive the thermal energy along a side portion, a rear portion, the bottom portion, a top portion or any combination thereof. For example, in FIG. 1B, the external heat source 102 may include a lid 112. In FIG. 1B, the lid 112 is depicted in an open position. However, the cooking device 104 may be positioned on a grilling surface 114 of the external heat source 102 and the lid 112 may be moved to a closed position. In this circumstance, the cooking device 104 may be substantially within the external heat source 102. In an alternative example, the external heat source 102 may include a rotisserie cooking element, or the like, that is positioned along a rear portion of the cooking device 104. In the alternative example, the cooking device 104 may receive thermal energy from a bottom portion and/or along a rear portion.

Additionally, in some embodiments a user may disassemble the cooking device 104. When disassembled, the user may introduce some alternative external heat sources to the cooking device 104 or may enable direct heating through a disassembled portion of the cooking device 104. For example, in the example above with the rotisserie cooking element, a user may remove a rear portion of the cooking device 104 to allow the thermal energy from the rotisserie cooking element to more directly heat the cooking device 104.

Referring to FIGS. 1A and 1B, the cooking device 104 may be removable from the external heat source 102. The removability of the cooking device 104 may enable the cooking device 104 to be positioned relative to one or more different external heat sources and may enable use of the external heat source 102 without the cooking device 104. For example, in the cooking device 100B in FIG. 1B, the external heat source 102 may include a propane grill. When the cooking device 104 is positioned relative to the external heat source 102, the cooking device 104 may substantially cover the grilling surface 114. Thus, to otherwise use grilling surface 114 of the external heat source 102, a user may remove the cooking device 104 from the external heat source 102.

Alternatively, in the cooking system 100A in FIG. 1A, the cooking device 104 may be removable or may be attached to the external heat source 102. In the embodiment depicted in FIG. 1A, the cooking system 100A includes the cooking device 104, which may be positioned next to an independent grill 106. The cooking device 104 and the independent grill 106 may share a support structure 108. In embodiments in which the cooking device 104 is attached to the external heat source 102, the cooking device 104 may be secured to the support structure 108 during a substantial portion of the useful life of the cooking system 100A. In embodiments in which the cooking device 104 is removable, the cooking device 104 may be removed from the support structure 108 between uses to enable another application of the external heat source 102.

The cooking system 100A includes the independent grill 106, which may include, but is not limited to, a propane grill, a natural gas grill, a charcoal grill, a wood grill, an electrical grill, etc. However, the configuration of the cooking system 100A is not meant to be limiting. In some alternative embodiments, the cooking system 100A may only include the cooking device 104, which may be attached to the support structure 108. Alternatively still, the cooking device 104 may be paired with another appliance or device.

In the cooking systems 100A and 100B, the cooking device 104 and the external heat source 102 may share a fuel and/or a fuel source (not shown). For example, in the cooking system 100A of FIG. 1A, the independent grill 106 may use propane gas as a fuel. One or more knobs 110A may control a supply of the fuel to the independent grill 106, while one or more other knobs 110B may control a supply of the fuel to the cooking device 104. In some alternative embodiments, the independent grill 106 and the cooking device 104 may be fueled by different fuel sources. For example, the grill 106 may be charcoal or wood grill while the cooking device 104 may be heated by burning propane gas.

In the cooking system 100B of FIG. 1B, the cooking device 104 may essentially take the place of foodstuffs being heated on the grilling surface 114. Thus, the external heat source 102 may generate thermal energy using the fuel source and the thermal energy may then be directly transferred to the cooking device 104. In some embodiments, the cooking device 104 may be sized such that the cooking device 104 covers a substantial portion of the grilling surface 114. In these and other embodiments, a majority of the thermal energy produced by the external heat source 102 may be transferred to the cooking device 104. Alternatively, the cooking device 104 may be sized to cover only a portion of the grilling surface 114. In these and other embodiments, sizing the cooking device 104 to cover only a portion of the grilling surface 114 may enable use of the cooking device 104 with foodstuffs positioned on a remainder of the grilling surface 114, for instance.

The external heat source 102 may include, but is not limited to, a charcoal grill, a wood grill, a wood smoker, a gas smoker, a pellet stove, a natural gas grill, an electric grill, an electric oven, a gas oven, or a propane grill. Accordingly, a fuel source of the external heat source 102 may include any fuel that generates thermal energy that may be transferred to the cooking device 104. For example, the fuel source may include, but is not limited to, propane gas, natural gas, wood, wood pellets, charcoal, electricity, etc.

In some embodiments, the external heat source 102 may be configured for residential or outdoor settings. For example, in embodiments in which the external heat source 102 is a propane grill, the external heat source 102 may be configured for use on a deck or a patio or in a backyard of a user. Accordingly, the cooking device 104, when used in conjunction with the external heat source 102 may enable creation of a high-heat environment at a residence of a user. This may enable the efficient use of the external heat device 102, may allow creation of the high-heat environment without heating the interior of a house of the user, and may efficiently use and re-purpose an external heat source 102 that the user already owns. In some embodiments, the external heat source 102 may be configured for a commercial charbroiler or gas grill. In these and other embodiments, the cooking device 104 may be used in conjunction with the external heat source 102 to enable creation of a high-heat environment at a commercial kitchen or restaurant. Again, use of the cooking device 104 may enable the efficient use of the external heat device 102, may allow creation of the high-heat environment without heating an entire restaurant, and may efficiently use and re-purpose an external heat source 102 that the user already owns.

Figure 2A:
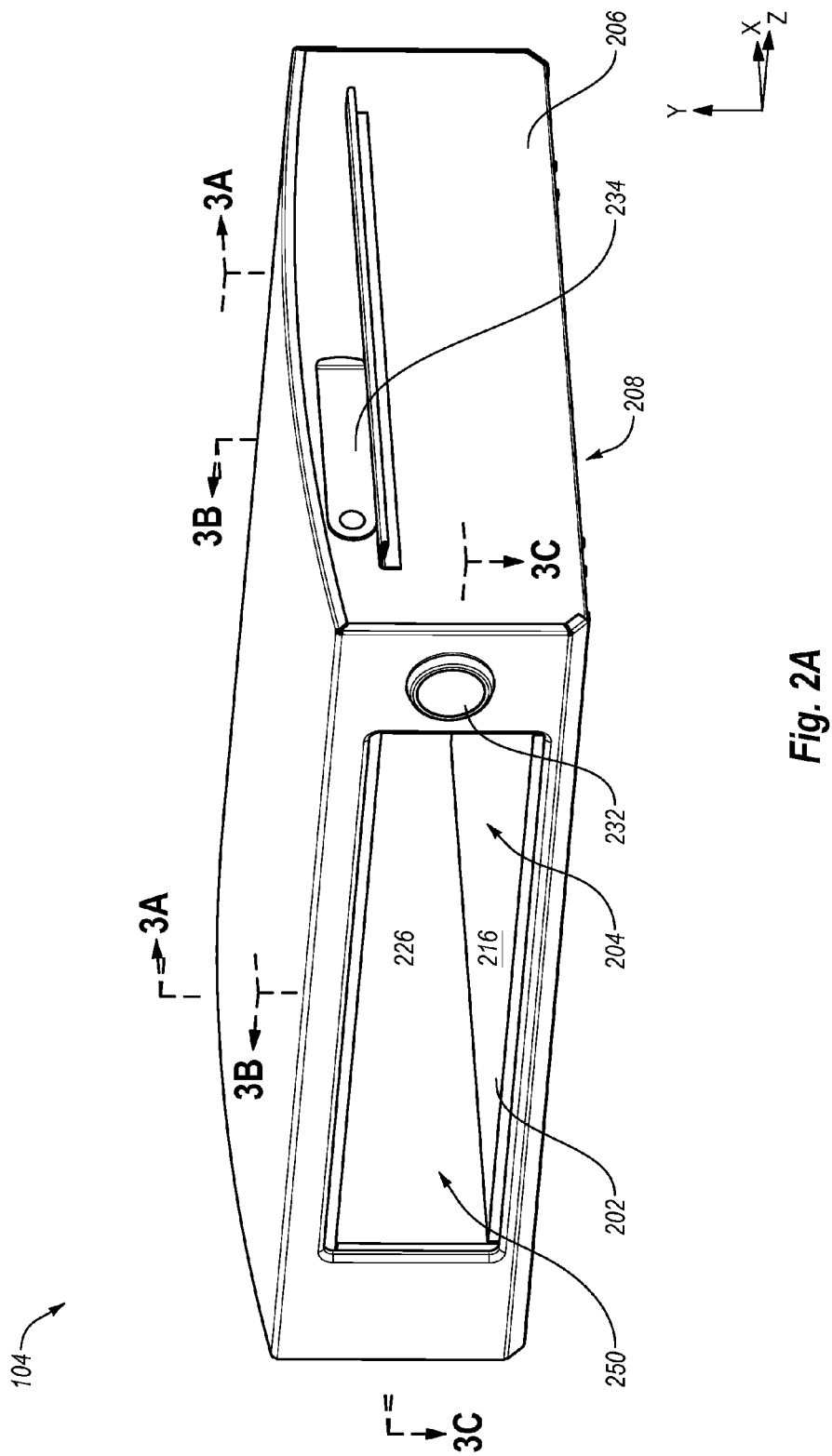
FIGS. 2A-2C illustrate an example cooking device that may be implemented in the cooking system of FIGS. 1A and 1B.
Figure 2B:
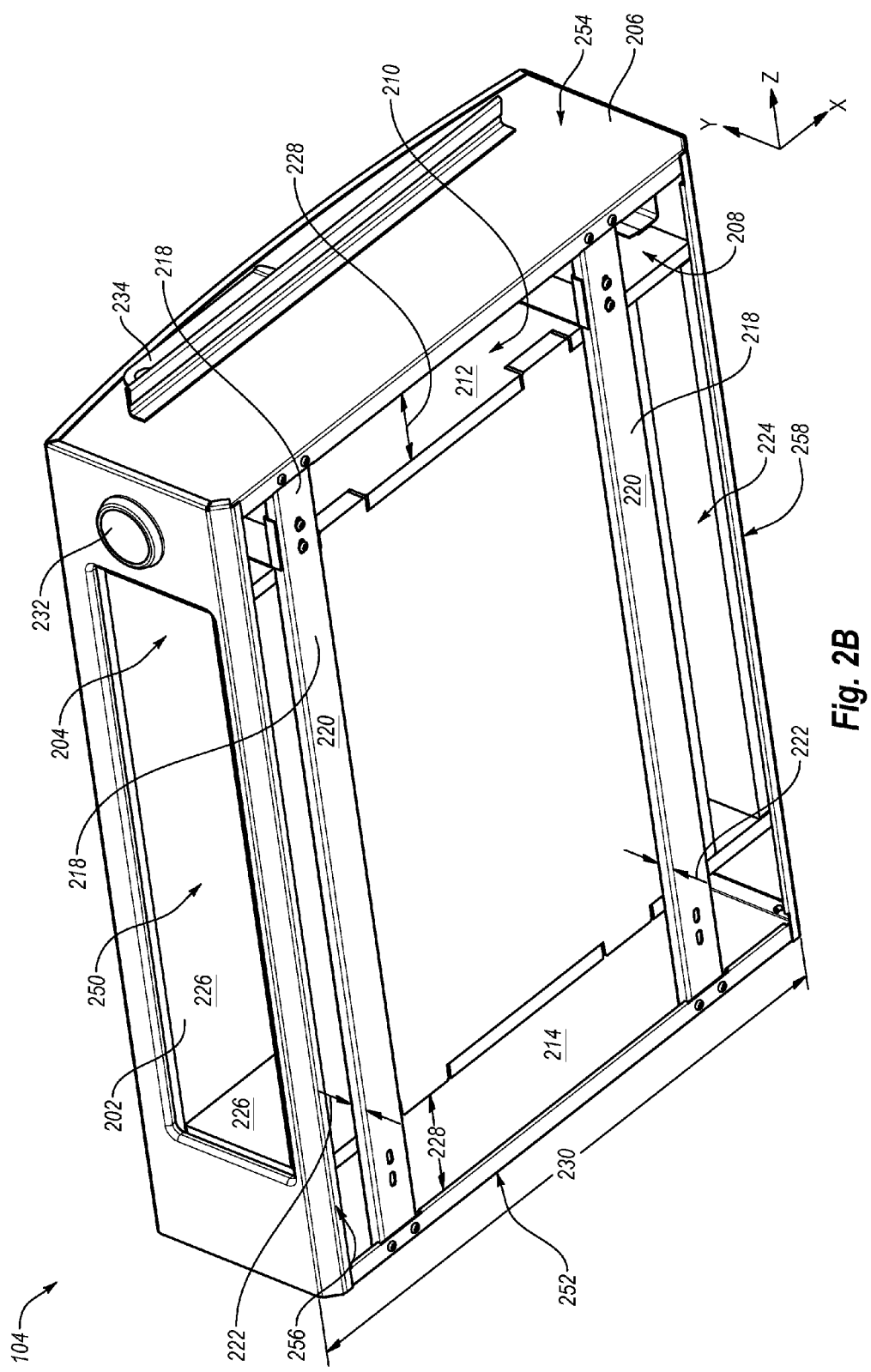
Figure 2C:
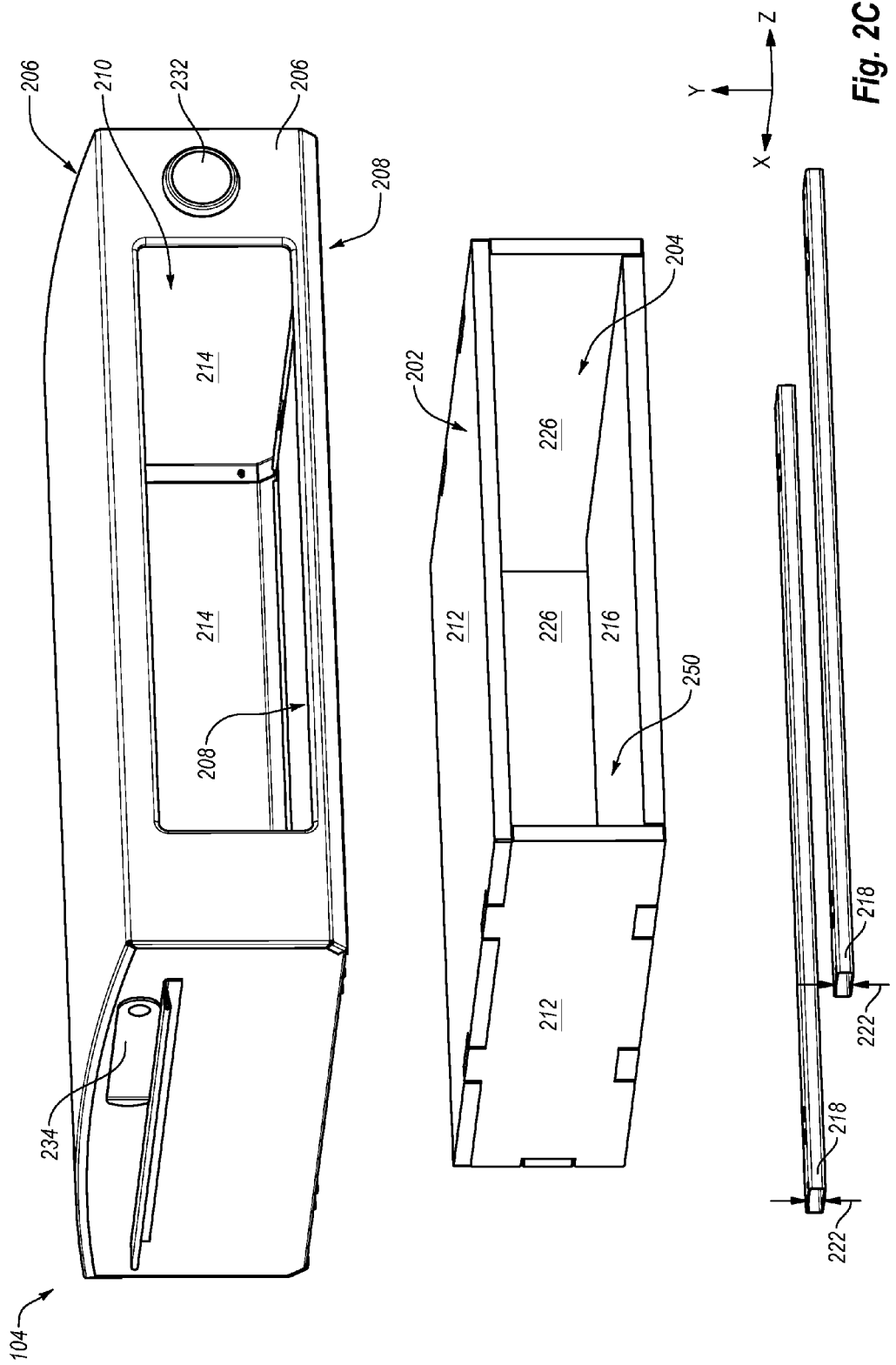

FIGS. 2A-2C illustrate an example cooking device 104 that may be implemented in the cooking systems 100A and 100B of FIGS. 1A and 1B in accordance with at least one embodiment described herein. Specifically, FIG. 2A is a perspective view of the cooking device 104, FIG. 2B is a second perspective view of the cooking device 104, and FIG. 2C is a partially exploded view of the cooking device 104. The cooking device 104 may generally be configured to receive thermal energy from an external heat source such as the external heat source 102 of FIGS. 1A and 1B, and to transfer the thermal energy to foodstuffs positioned inside the cooking device 104. The cooking device 104 may be suitable for cooking foodstuffs that are properly cooked in a high-heat environment through efficient retention and transfer of thermal energy to the foodstuffs. For example, the cooking device 104 may be configured to substantially surround foodstuffs while foodstuffs are positioned inside the cooking device 104 and may use a combination of thermal conduction, thermal convection, and thermal radiation to heat the foodstuffs.

The cooking device 104 may include a refractory oven 202. The refractory oven 202 may be used in combination with a housing 206 or may be used without the housing 206. For instance, with combined reference to FIGS. 1B and 2C, the refractory oven 202 may be positioned on the grilling surface 114 of the external heat source 102 without the housing 206. The lid 112 may be placed in the closed position over the refractory oven 202, may be placed in a partially closed position, may be left in the open position, or aluminum foil may be used to cover the refractory oven 202. The refractory oven 202 may receive thermal energy from the external heat source 102. Alternatively, the refractory oven 202 may be positioned within the housing 206. The refractory oven 202 and the housing 206 may then be positioned on the grilling surface 114 as shown in FIG. 1B.

Referring back to FIGS. 2A-2C, when the housing 206 is used with the refractory oven 202, the housing 206 may at least partially surround the refractory oven 202. In some embodiments, the refractory oven 202 may be introduced into the housing 206 through a bottom opening 208. With reference to FIGS. 2B and 2C, for instance, with the housing 206 held in a constant position, the refractory oven 202 may be moved in the arbitrarily defined positive y-direction and thus be introduced into the housing 206.

In some embodiments, one or more support braces 218 may be included in the cooking device 104. The one or more support braces 218 (FIGS. 2B and 2C only) may be configured to at least partially secure the refractory oven 202 to the housing 206. Additionally, the support braces 218 may lift the refractory oven 202 some distance off a grilling surface. For example, with combined reference to FIGS. 1B, 2B, and 2C, when the cooking device 104 is positioned on the grilling surface 114, the support braces 218 may lift the refractory oven 202 a distance from the grilling surface 114. For example, a bottom surface 220 (FIG. 2B only) of the support braces 218 may be in contact with the grilling surface, which may lift the refractory oven 202 the distance from the grilling surface. In this and other examples, the distance may be about equal to a height 222 (FIGS. 2B and 2C only) of the support braces 218. By lifting the refractory oven 202, a portion of the thermal energy that may have otherwise been received by the refractory oven 202 may escape to a surrounding environment and/or be received by a heated volume 210 (discussed below), which may be defined between the housing 206 and the refractory oven 202. Additionally, lifting the refractory oven 202 from the grilling surface 114 may decrease wear imposed on the grilling surface 114 that may result from having the refractory oven 202, after being heated, in direct contact with the grilling surface 114.

Referring back to FIGS. 2A-2C, the cooking device 104 may generally define two volumes. A first volume, which is referred to herein as a cooking chamber 204, may be defined by the refractory oven 202. For example, the cooking chamber 204 may include a volume that is substantially bordered by an internal surface 226 and a cooking surface 216 of the refractory oven 202.

The cooking chamber 204 may be configured to receive thermal energy from an external heat source (e.g., the external heat source 102 of FIGS. 1A and 1B). In some embodiments, the cooking chamber 204 may receive multiple types of thermal energy, which may be transferred to foodstuffs that are positioned inside the cooking chamber 204. Specifically, the refractory oven 202 may be configured to absorb and to retain thermal energy in the structure of the refractory oven 202. The internal surface 226 of the refractory oven 202 may then transfer the absorbed thermal energy to foodstuffs positioned therein via thermal radiation. Additionally, when foodstuffs are positioned inside the refractory oven 202, the foodstuffs may be positioned in contact with the cooking surface 216. While positioned in contact with the cooking surface 216, thermal energy may be transferred to the foodstuffs via thermal conduction. Additionally still, while foodstuffs are positioned inside the refractory oven 202, a heated gas may be passed over the foodstuffs. Thermal energy in the heated gas may be transferred to the foodstuffs via thermal convection. The heated gas may include heated ambient air and/or exhaust gases that may result from combustion of a flammable gas, charcoal, wood, wood pellets, etc.

For example, with specific reference to FIG. 2B, the refractory oven 202 may define an opening 250 and a vent 224. The opening 250 may be configured to allow foodstuffs to be introduced into and removed from the cooking chamber 204. The vent 224 may be positioned in relationship to the opening 250 to receive a portion of the thermal energy in a heated gas into the cooking chamber 204 and to allow the portion of the heated gas to flow across the foodstuffs toward the opening 250. The opening 250 may be configured to allow the portion of the thermal energy to exit the cooking chamber 204. The opening 250 may be left open or may be selectively covered by a door (not shown). In embodiments without a door, or positioning the door in an open position, may allow monitoring and adjustment of foodstuffs through the opening 250.

In some embodiments, the opening 250 may be positioned opposite the vent 224. In these and other embodiments, the vent 224 may allow a heated gas to enter the cooking chamber 204 then pass over foodstuffs positioned inside the refractory oven 202. The opening 250 may be configured to allow the heated gas or thermal energy included therein to exit the cooking chamber 204. As the heated gas passes over the foodstuffs positioned between the vent 224 and the opening 250, thermal energy may be transferred to the foodstuffs via thermal convection.

In this and other embodiments, the refractory oven 202 defines one vent 224, the vent 224 is substantially rectangular, the vent 224 spans essentially a width of the refractory oven 202, and the vent 224 is defined towards a rear portion (opposite the opening 250) of the refractory oven 202. This configuration of the vent 224 is not meant to be limiting. For example, some embodiments may include multiple vents that include various shapes and that may be defined at one or more other locations on the refractory oven 202. Additionally, in this and other embodiments, the heated gas may exit through the opening 250. However, this is not meant to be limiting. In some embodiments, the heated gas may exit through one or more other openings and/or one or more vents defined in the refractory oven 202.

Referring back to FIGS. 2A-2C, the second volume included in the cooking device 104, which is referred to herein as the heated volume 210, may be defined by the housing 206 and the refractory oven 202. The heated volume 210 may be defined between an external surface 212 (FIGS. 2B and 2C only) of the refractory oven 202 and an internal surface 214 (FIGS. 2B and 2C only) of the housing 206. The heated volume 210 may also be defined to be bordered by the bottom opening 208 of the housing 206. The heated volume 210 may be configured to receive thermal energy from an external heat source.

With reference to FIG. 2B, the internal surface 214 of the housing 206 and the external surface 212 of the refractory oven 202 may be separated by distances 228. The distances 228 may run along the length 230 of the housing 206, which may create an area of the bottom opening 208 in which thermal energy may enter the heated volume 210. For example, with combined reference to FIGS. 1B and 2B, when the cooking device 104 is positioned on the grilling surface 114, a portion of the grilling surface 114 may be positioned beneath the area of the bottom opening 208 between the internal surface 214 of the housing 206 and the external surface 212 of the refractory oven 202. The external heat source 102 may accordingly transfer thermal energy to the heated volume 210.

In this and other embodiments, the distances 228 may be essentially constant along the length 230 of the housing 206. However, in some alternative embodiments, the distances 228 may vary along the length of the housing 206. The distances 228 may be based on the shapes of the refractory oven 202 and the housing 206, for instance. Additionally, in this and other embodiments, the refractory oven 202 and the housing 206 may be configured such that the distances 228 may only exist on a left side, which is generally indicated in FIG. 2B by 252, and a right side, which is generally indicated in FIG. 2B by 254, of the refractory oven 202. However, in alternative embodiments, the refractory oven 202 and the housing 206 may be configured such that distances 228 may exist on the left side 252, the right side 254, a front, which is generally indicated in FIG. 2B by 256, a back, which is generally indicated in FIG. 2B by 258, or any combination thereof. Additionally, in this and other embodiments, the distances 228 may be essentially equal on the left side 252 and on the right side 254 of the refractory oven 202, which may essentially center the refractory oven 202 with respect to the housing 206 in the x-direction. However, in some embodiments, the distances 228 on the right side 254 of the refractory oven 202 may be different from the left side 252 of the refractory oven 202.

Referring back to FIGS. 2A-2C, the heated volume 210 may be configured to reduce the transfer of thermal energy from the cooking chamber 204 through the refractory oven 202. As mentioned above, the structure of the refractory oven 202 may absorb thermal energy, which may be transferred to foodstuffs through thermal radiation. By lowering a thermal gradient at the external surface 212 of the refractory oven 202 (i.e., by heating the heated volume 210), the thermal energy absorbed by the thermal energy may be retained in the structure of the refractory oven 202. Some additional details of the heated volume 210 are provided with reference to FIGS. 3A-3C.

In this and other embodiments, the cooking device 104 may be generally rectangular. For example, the refractory oven 202 may include substantially rectangular surfaces (e.g., 212, 216, and 226) and the bottom opening 208 into which the refractory oven 202 may be introduced may be substantially rectangular. The rectangular shape of the cooking device 104 may correspond to external heating devices that include grilling surfaces (e.g., the grilling surface 114 of FIG. 1B) that may be rectangular. Accordingly, the cooking device 104 may receive thermal energy from a substantial portion of a grilling surface and/or may not hang off the edges of the grilling surface. In alternative embodiments, the cooking device 104 may be generally circular, oval, square, or "D"-shaped. In these and other alternative embodiments, the vent 224, the opening 250, the distances 228, the heated volume 210, the cooking chamber 204, etc. may include different shapes than those shown in FIGS. 2A-2C, and may perform one or more similar functions.

Additionally, the cooking device 104 may include one or more thermometers 232. The thermometer 232 may be used to monitor the temperature of the heated volume 210 and/or the cooking chamber 204. The thermometer 232 may include a bi-metal thermometer, an infrared thermometer, a resistance thermometer, a thermocouple, a pyrometer, or any other type of suitable temperature measuring device.

Additionally, the cooking device 104 may include one or more lid supports 234. The lid supports 234 may be used to support a lid such as the lid 112 of FIG. 1B. For example, when the cooking device 104 is positioned relative to an external heat source that includes a lid, the lid may be positioned in a partially closed position in which the lid rests on the lid supports 234.

Additionally, the cooking device 104 may include a firebox (not shown). The firebox may be constructed from expanded sheet metal, perforated metal, or the like. The firebox may be positioned in the cooking chamber 204. A fire may be started in the firebox to introduce additional radiant heating to foodstuffs positioned in the cooking chamber 204. Additionally or alternatively, the firebox may be configured to receive woods or wood chips that may be used to introduce smoke into the cooking chamber 204. The smoke may flavor the foodstuffs.

The refractory oven 202, or some portion thereof, may be composed of a material selected for thermal conductivity, strength, density, and thermal shock resistance properties. For example, the refractory oven 202 may be composed of Cordierite and FibraMent.

Figure 3A:
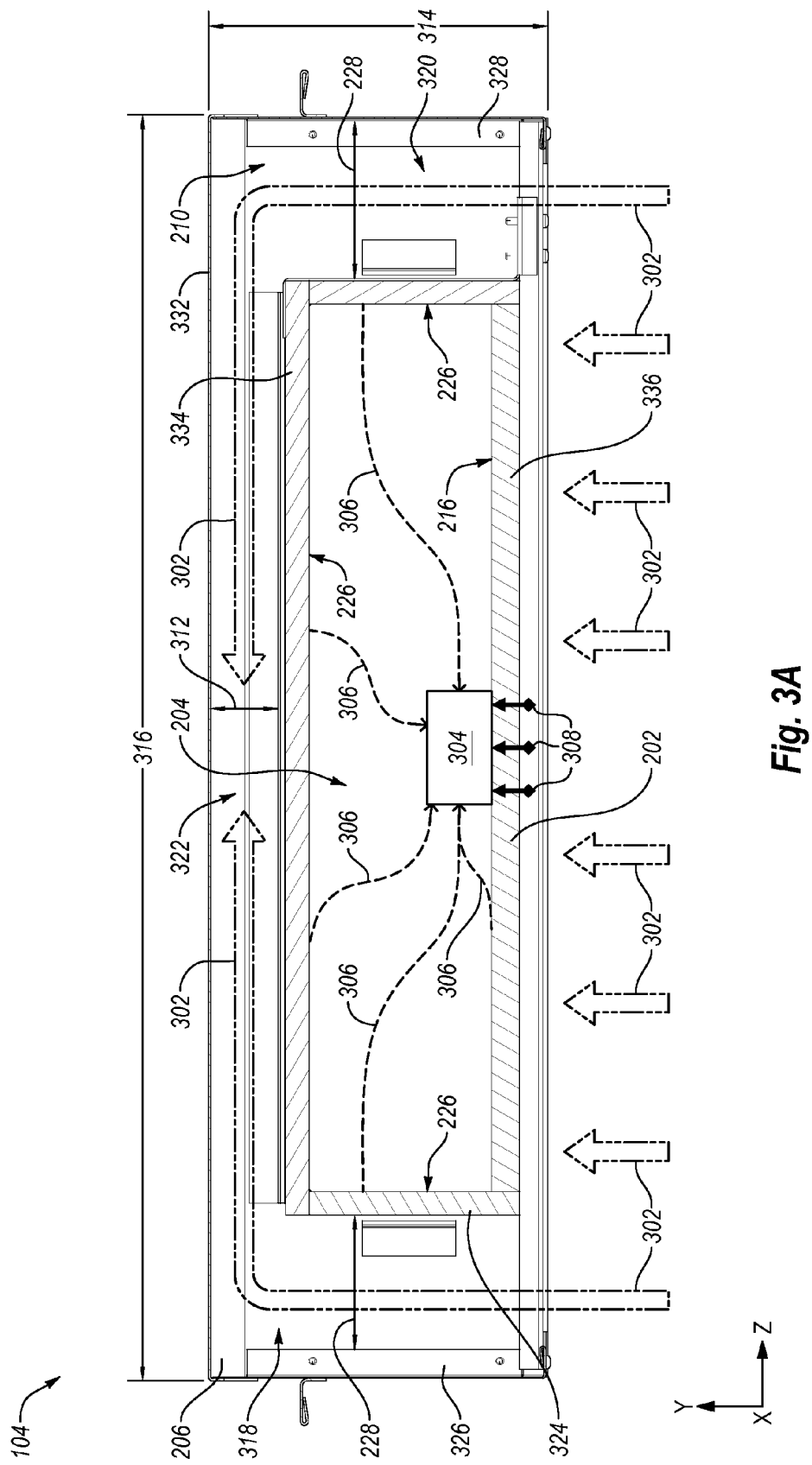
FIGS. 3A-3C are sectional views that illustrate example thermodynamic characteristics of the cooking device of FIGS. 2A-2C.
Figure 3B:
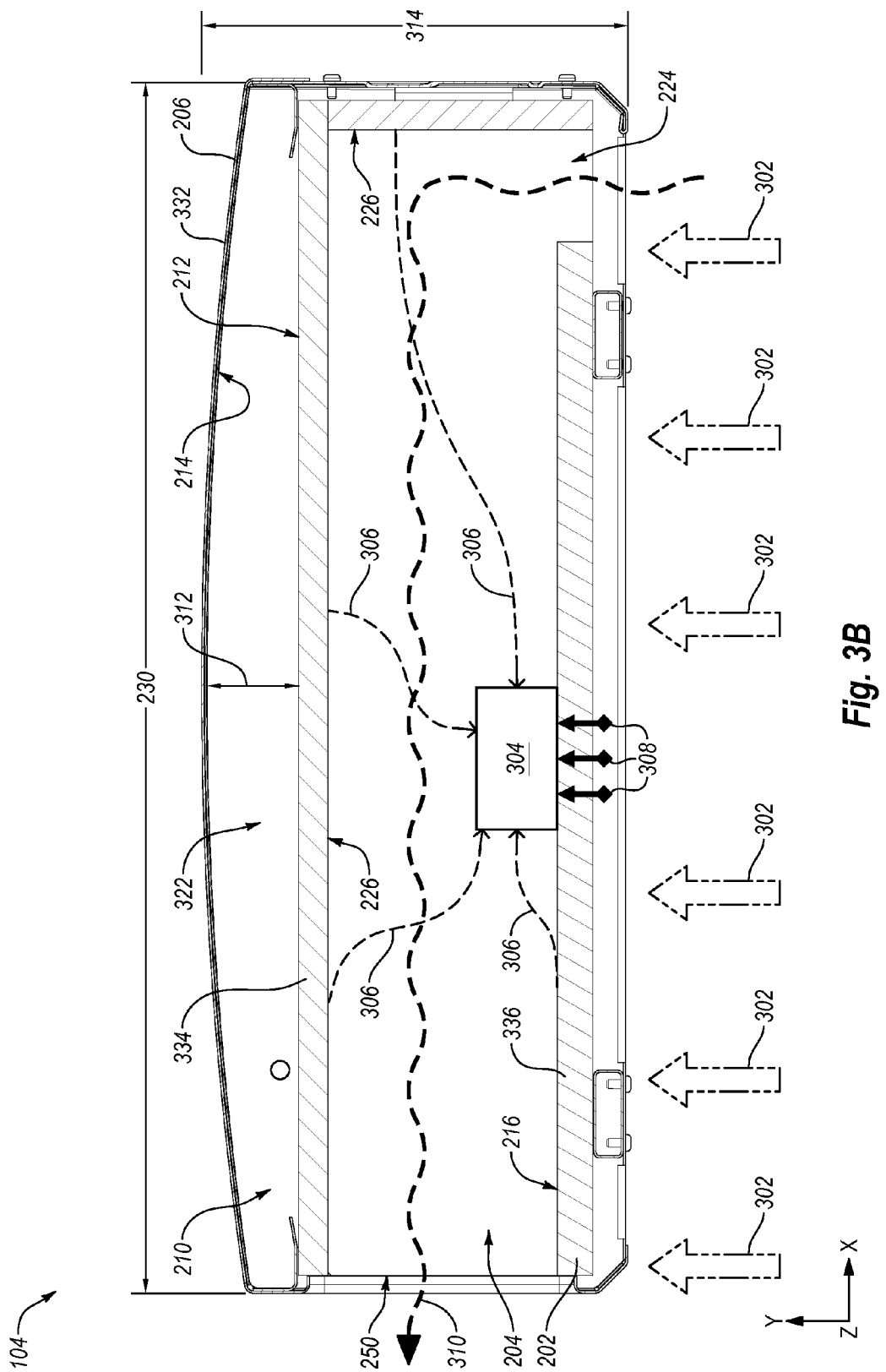
Figure 3C:
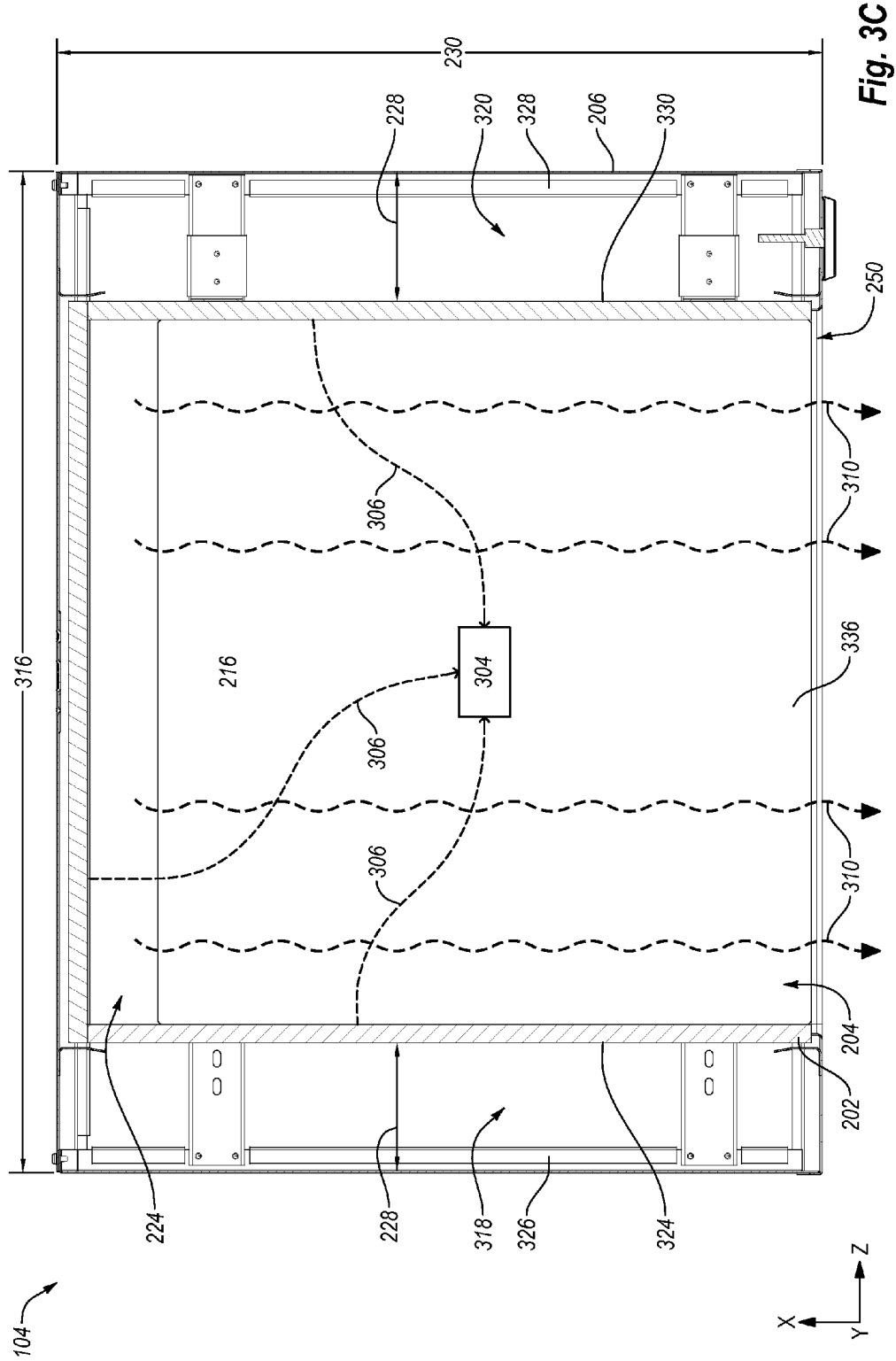

FIGS. 3A-3C are sectional views of the cooking device 104 that illustrate example thermodynamic characteristics of the cooking device 104 in accordance with at least one embodiment described herein. Specifically, FIG. 3A is a sectional view generated using a first plane labeled 3A in FIG. 2A. FIG. 3B is a second sectional view generated using a second plane labeled 3B in FIG. 2A. FIG. 3C is a third sectional view generated using a third plane labeled 3C in FIG. 2A. Generally, the first, second, and third sectional views are substantially orthogonal to one another. FIGS.

3A-3C illustrate the cooking device 104 described with reference to FIGS. 1A-2C. Accordingly, multiple components and features (e.g., 202, 204, 206, 208, 224, 228, 230, and 250) described with reference to FIGS. 1A-2C are included in FIGS. 3A-3C. Some details of these components and features are not repeated with reference to FIGS. 3A-3C.

In FIGS. 3A-3C, thermal energy may be transferred from an external heat source to the cooking device 104. The thermal energy transferred from the external heat source is represented in FIGS. 3A and 3B by block arrows 302. As best illustrated in FIG. 3A, the thermal energy 302 may be received by the refractory oven 202 and the heated volume 210. The thermal energy 302 received by the refractory oven 202 may be used to heat foodstuffs 304 positioned within the cooking chamber 204 and the thermal energy 302 received by the heated volume 210 may be used to reduce thermal energy transfer from the cooking chamber 204 through the refractory oven 202.

As mentioned above, heating the foodstuffs 304 may occur in multiple modes of thermal energy transfer. The multiple modes of thermal energy transfer may combine to create a high-heat environment in the cooking chamber 204 as well as combine to heat the foodstuffs 304 while positioned inside the cooking chamber 204.

A first mode may include thermal radiation. The thermal radiation is represented in FIGS. 3A-3C by dashed, curved, thin arrows 306. Generally, thermal radiation 306 may occur when the refractory oven 202 absorbs thermal energy. The thermal radiation 306 may be emitted by the internal surface 226 and/or the cooking surface 216 of the refractory oven 202. As shown in FIGS. 3A-3C, thermal energy may be transferred to the foodstuffs 304 via thermal radiation 306 that may originate throughout the refractory oven 202. Accordingly, a substantial portion of the foodstuffs 304 and/or multiple surfaces of the foodstuffs 304 may be heated by the thermal radiation 306.

A second mode of thermal energy transfer may include thermal conduction. In FIGS. 3A and 3B, the thermal conduction is represented by solid arrows 308. Generally, thermal conduction 308 may occur when two objects having differing temperatures contact one another. In the cooking device 104, the foodstuffs 304 may be positioned to contact the cooking surface 216. The cooking surface 216 may have been heated by the thermal energy 302 received from the external heat source. Accordingly, when the foodstuffs 304 contacts the cooking surface 216, the cooking surface 216 may transfer thermal energy to the foodstuffs 304 via thermal conduction 308.

A third mode of thermal energy transfer may include thermal convection. In FIGS. 3B and 3C the thermal convection is represented by dashed, curved thick arrows 310. Generally, thermal convection 310 may occur when a heated gas moves through the cooking chamber 204. In this and other embodiments, the thermal energy 302 may heat air or another gas in the cooking chamber 204 or may emit a heated fluid. The heated gas may enter the cooking chamber 204 through the vent 224 and exit the cooking chamber 204 through the opening 250. As the heated gas passes over and/or around the foodstuffs 304, thermal energy may be transferred to the foodstuffs via thermal convection 310.

In this and other embodiments, the heated volume 210 may include a volume that partially surrounds the refractory oven 202. Specifically, the heated volume 210 may include multiple sub-volumes 318, 320, and 322. As best illustrated in FIG. 3A, the sub-volumes 318, 320, and 322 may each be heated by the thermal energy 302 received from the external heat source.

A first sub-volume 318 of the heated volume 210 may be defined between a first panel 326 of the housing 206, a first side portion 324 of the refractory oven 202, and a top cover 332 of the housing 206. Thus, the first sub-volume 318 may include a width substantially equal to the distance 228, a height substantially equal to a height 314 of the housing 206, and a length substantially equal to the length 230 of the housing 206. The height 314 of the housing 206 may vary along the length 230.

Likewise, a second sub-volume 320 may be defined between a second panel 328 of the housing 206, a second side portion 330 of the refractory oven 202, and a top cover 332 of the housing 206. Thus, the second sub-volume 320 may include a width substantially equal to the distance 228, a height substantially equal to the height 314 of the housing 206, and a length substantially equal to the length 230 of the housing 206.

A third sub-volume 322 may be defined between the first and second sub-volumes 318 and 320 and between a top portion 334 of the refractory oven 202 and the top cover 332 of the housing 206. A second distance 312 may be defined as a distance between the top portion 334 and the top cover 332. In this and other embodiments, the top cover 332 may be curved in the yz-plane, thus the second distance 312 (and the height 314 of the housing 206) may vary along the length 230 of the housing 206 and may be constant along a width 316 of the housing 206. Additionally or alternatively, the top cover 332 may be curved in the xy-plane. In these and other embodiments, the second distance 312 (and the height 314 of the housing 206) may vary along the width 316 and/or the length 230 of the housing 206.

In some embodiments, to heat the heated volume 210, the thermal energy 302 may enter the first and second sub-volumes 318 and 320. The thermal energy 302 may then heat the third sub-volume 322. When the sub-volumes 318, 320, and 322 are heated, the heated volume 210 may reduce transfer of thermal energy from the cooking chamber 204 through the refractory oven 202. For example, with reference to FIG. 3B, the heated volume 210 may be heated to reduce a thermal gradient between the cooking chamber 204 and the heated volume 210 across the top portion 334. Thus, thermal energy transfer through the top portion 334 may be reduced.

In effect, by reducing transfer of thermal energy from the cooking chamber 204, the heated volume 210 additionally reduces a thermal gradient within the cooking chamber 204. For example, without the housing 206 and/or the heated volume 210, thermal energy may be lost through the refractory oven 202. Consequently, the top portion 334, the first side portion 324, and the second side portion 330, other portions, or some combination thereof of the refractory oven 202 may be at a low temperature when compared to a bottom portion 336 of the refractory oven 202. The lower temperatures of some portion of the refractory oven 202 may create temperature gradients within the cooking chamber 204. Additionally, the lower temperature of the top portion 334, the first side portion 324, and the second side portion 330 may reduce the transfer of thermal energy to the foodstuffs 304 via the thermal radiation 306.

In some embodiments, configurations of the heated volume 210 and/or the cooking chamber 204 may control one or more thermal characteristics of the cooking device 104. In particular, the configurations of the heated volume 210 and/or the cooking chamber 204 may determine the distance 228, the second distance 312, a variation of the distances 228 along the length 230, a variation of the second distance 312 along the width 316 and/or the length 230, or some combination thereof. For example, in some embodiments, the distances 228 and the second distance 312 may be configured such that when the cooking surface 216 is above about 600 degrees F., the temperature gradients within the cooking chamber 204 may be maintained between about 75% and about 100% of the temperature of the cooking surface 216. Additionally or alternatively, the heated volume 210 and/or the cooking chamber 204 may be configured to maintain the temperatures of the refractory oven 202 within about 100 degrees F. when the cooking surface 216 is between about 600 degrees F. and about 1100 degrees F.

As best illustrated in FIGS. 3B and 3C, the housing 206 may be separated from the refractory oven 202 along the side portions 324 and 330 and the top portion 334, thereby creating the heated volume 210. Additionally, the housing 206 may be substantially adjacent to the refractory oven 202 along a rear portion 340 and around a perimeter of the opening 250. In these and other embodiments, the heated volume 210 may, accordingly, not include sub-volumes along the rear portion 340 and/or around the perimeter of the opening 250. However, this configuration of the heated volume 210 is not meant to be limiting. In some alternative embodiments, the heated volume 210 may include sub-volumes along the rear portion 340 and/or around the perimeter of the opening 250.

Figure 4A:
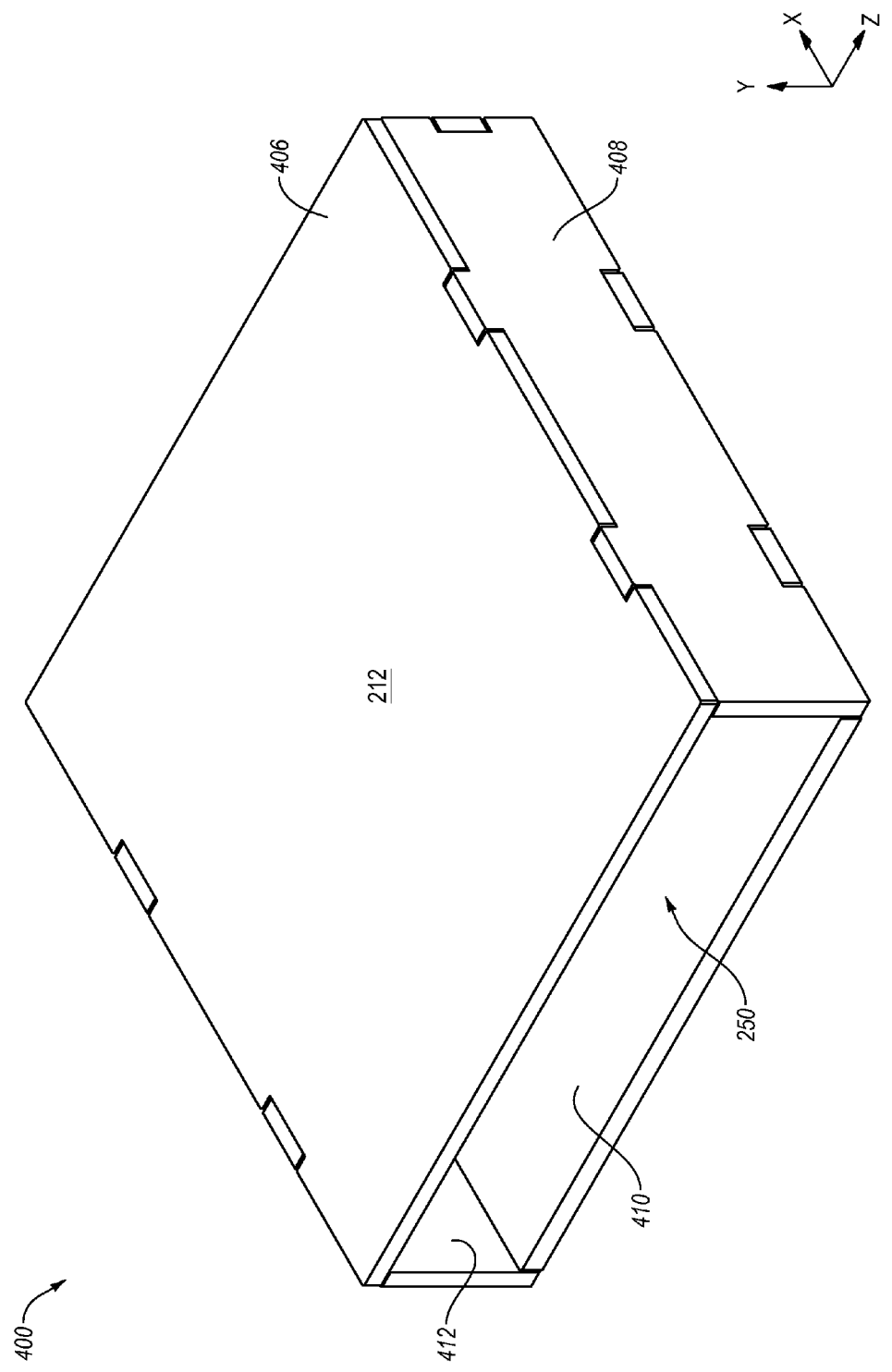
FIGS. 4A-4C illustrate an example refractory oven that may be implemented in the cooking device of FIGS. 2A-2C.
Figure 4B:
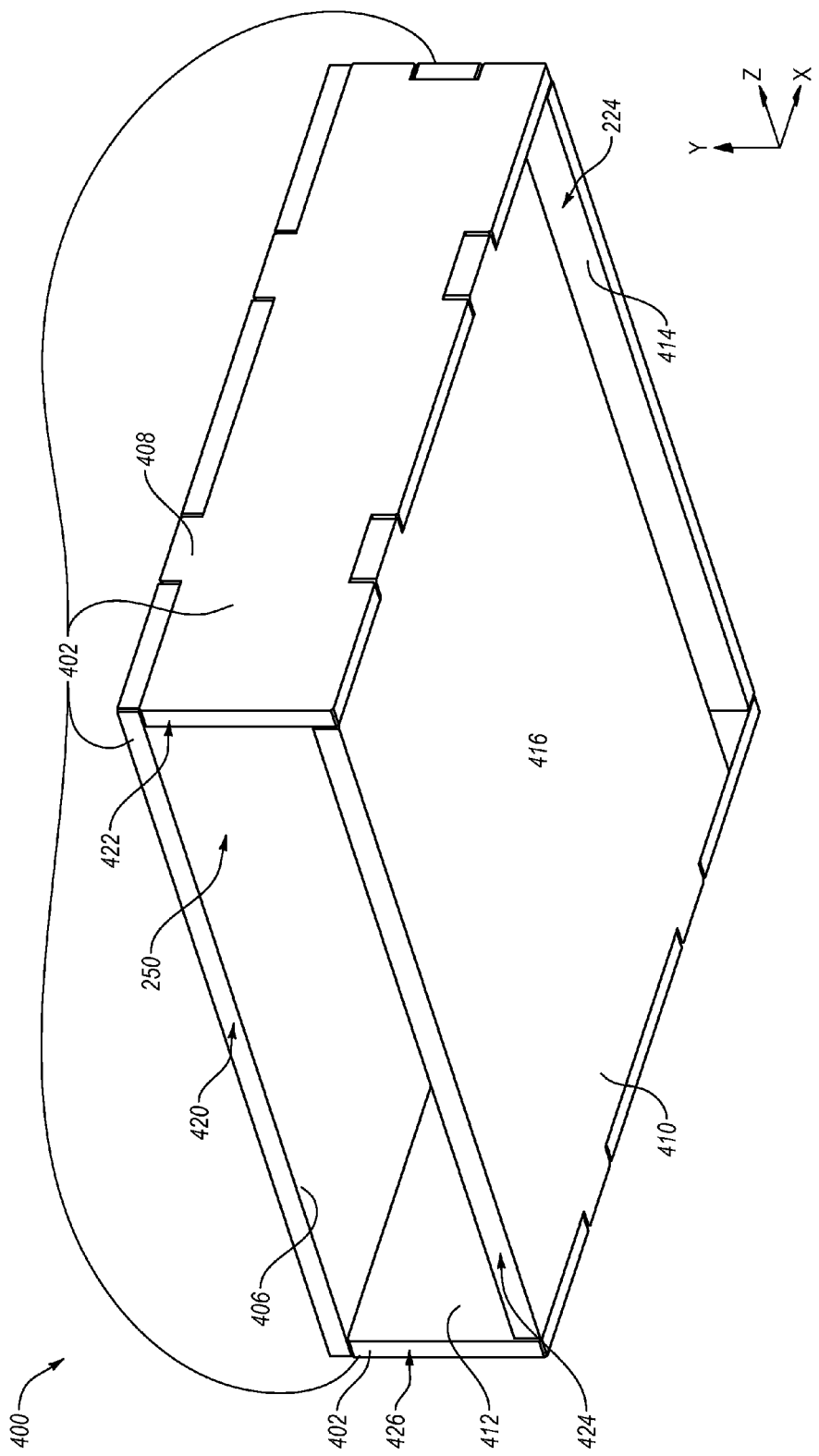
Figure 4C:
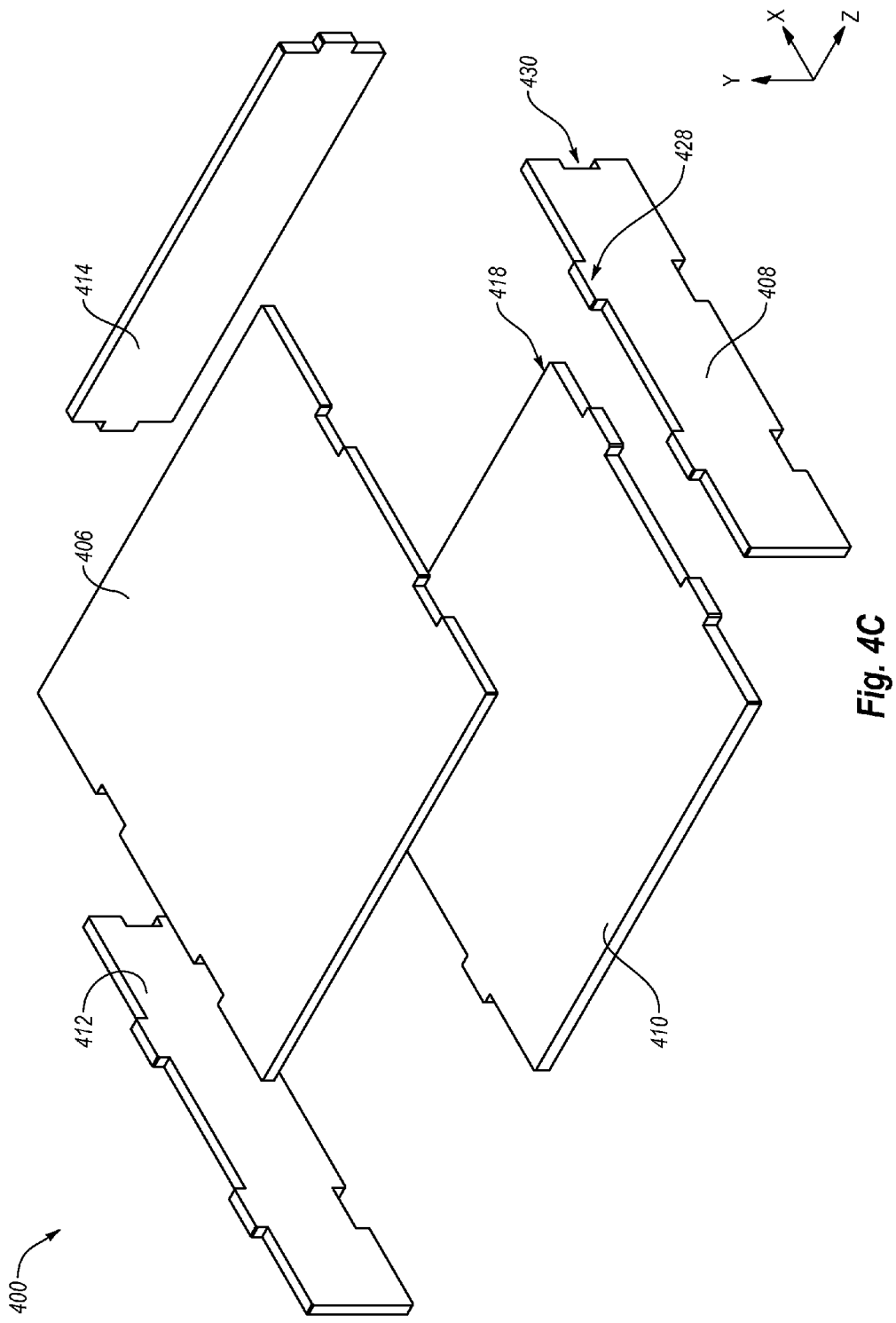

FIGS. 4A-4C illustrate an example refractory oven 400 that may be implemented in the cooking device 104 of FIGS. 2A-2C in accordance with at least one embodiment described herein. The refractory oven 400 may be substantially similar to the refractory oven 202 discussed with reference to FIGS. 2A-3C. For example, the refractory oven 400 may define the cooking chamber 204, the vent 224, and the opening 250. Additionally, the refractory oven 400 may receive thermal energy from an external heat source such as the external heat source 102 of FIGS. 1A and 1B. Some details of the cooking chamber 204, the vent 224, and the opening 250 or the general functions of the refractory oven 400 are not repeated with reference to FIGS. 4A-4C.

In some embodiments, the refractory oven 400 may include a refractory top piece 406, two refractory side pieces 408 and 412, a refractory rear piece 414, and a refractory bottom piece 410 (collectively, refractory pieces). With combined reference to FIGS. 3A-4C, the refractory top piece 406 may be substantially similar to and/or correspond to the top portion 334, two refractory side pieces 408 and 412 may be substantially similar to and/or correspond to two side portions 324 and 330, the refractory bottom piece 410 may be substantially similar to and/or correspond to the bottom portion 336, the refractory rear piece 414 may be substantially similar to and/or correspond to the rear portion 340, or any combination thereof.

The refractory top piece 406, the two refractory side pieces 408 and 412, the refractory rear piece 414, and the refractory bottom piece 410 may be combined to define the cooking chamber 204. The refractory bottom piece 410 may include the cooking surface 216 described above and a heated surface 416 (FIG. 4B only). When the refractory oven 400 is positioned adjacent to an external heat source, the heated surface 416 may be oriented towards the external heat source. Additionally, the vent 224 may be defined between an end surface 418 (FIG. 4C only) of the refractory bottom piece 410 and the refractory rear piece 414. Additionally, in the refractory oven 400, the opening 250 may be defined opposite the refractory rear piece 414. As above, the opening 250 may be configured to enable introduction and removal of foodstuffs from the cooking chamber 204 and to allow thermal energy to exit the cooking chamber 204.

Functionally, in the refractory oven 400, the refractory bottom piece 410 may be configured to absorb a first portion of the thermal energy received from the external heat source. The refractory bottom piece 410 may be further configured to transfer the absorbed first portion of the thermal energy to foodstuffs in contact with the refractory bottom piece 410 via thermal conduction. Additionally, the refractory top piece 406, the two refractory side pieces 408 and 412, and the refractory rear piece 414 may be configured to absorb a second portion of the thermal energy received from the external heat source. The refractory top piece 406, the two refractory side pieces 408 and 412, and the refractory rear piece 414 may be configured to transfer the absorbed thermal energy to the foodstuffs via thermal radiation. Additionally, the vent 224 may be configured to receive a third portion of the thermal energy from the external heat source as it enters the cooking chamber 204. The thermal energy may then be transferred to the foodstuffs via thermal convection. Additionally or alternatively, the thermal energy may be transferred to the refractory top piece 406, the two refractory side pieces 408 and 412, the refractory rear piece 414, and/or the refractory bottom piece 410 via thermal convection. Additionally or alternatively, the thermal energy may exit the cooking chamber 204 through the opening 250.

In some embodiments, one or more of the refractory pieces may be secured to one another. As best illustrated in FIG. 4C, one or more of the refractory pieces may include interlocking protrusions 428 (FIG. 4C only) and slots 430 (FIGS. 4B and 4C only) that may enable the refractory pieces to be secured with respect to one another. For example, in this and other embodiments, the refractory bottom piece 410 may be secured to the two refractory side pieces 408 and 412, the refractory top piece 406 may be secured to the two refractory side pieces 408 and 412, and the refractory rear piece 414 may be secured to the two refractory side pieces 408 and 412.

In some alternative embodiments, one or more of the refractory pieces may be a single piece. For example, in some embodiments, the two refractory side pieces 408 and 412, the refractory top piece 406, and the refractory rear piece 414 may be a single piece referred to as a refractory enclosure 402 (FIG. 4B only). In these and other embodiments, the interlocking protrusions 428 and the slots 430 between the two refractory side pieces 408 and 412, the refractory top piece 406, and the refractory rear piece 414 may be omitted and the refractory enclosure 402 may be manufactured as a single piece.

The refractory enclosure 402 may be positioned with respect to the refractory bottom piece 410 to define the cooking chamber 204. In particular, the refractory enclosure 402 may be positioned with respect to the refractory bottom piece 410 such that the internal surface 226 of the refractory enclosure 402 and a cooking surface 216 of the refractory bottom piece 410 define the cooking chamber 204. In some alternative embodiments, the refractory enclosure 402 may include another combination of the refractory pieces, without limitation.

In this and other embodiments, the refractory oven 400 is substantially rectangular. Specifically, the refractory bottom piece 410, the two refractory side pieces 408 and 412, the refractory top piece 406 and the refractory rear piece 414 are substantially rectangular. As used herein with reference to the refractory oven 400, the term "substantially rectangular" may refer to the overall or general shape of the refractory oven 400 or the refractory pieces 410, 408, 412, 406, and 414, which may include the interlocking protrusions 428 and the slots 430. However, this is not meant to be limiting. In some alternative embodiments, the refractory oven 400 may take other shapes such as a dome or pyramidal shaped. In these alternative embodiments, one or more of the refractory bottom piece 410, the two refractory side pieces 408 and 412, the refractory top piece 406 and the refractory rear piece 414 may be curved and/or non-rectangular.

In some embodiments, one or more of the refractory pieces may be composed of a material selected for thermal conductivity, strength, density, and thermal shock resistance properties. For example, one or more of the refractory pieces may be composed of Cordierite and FibraMent.

Figure 5A:
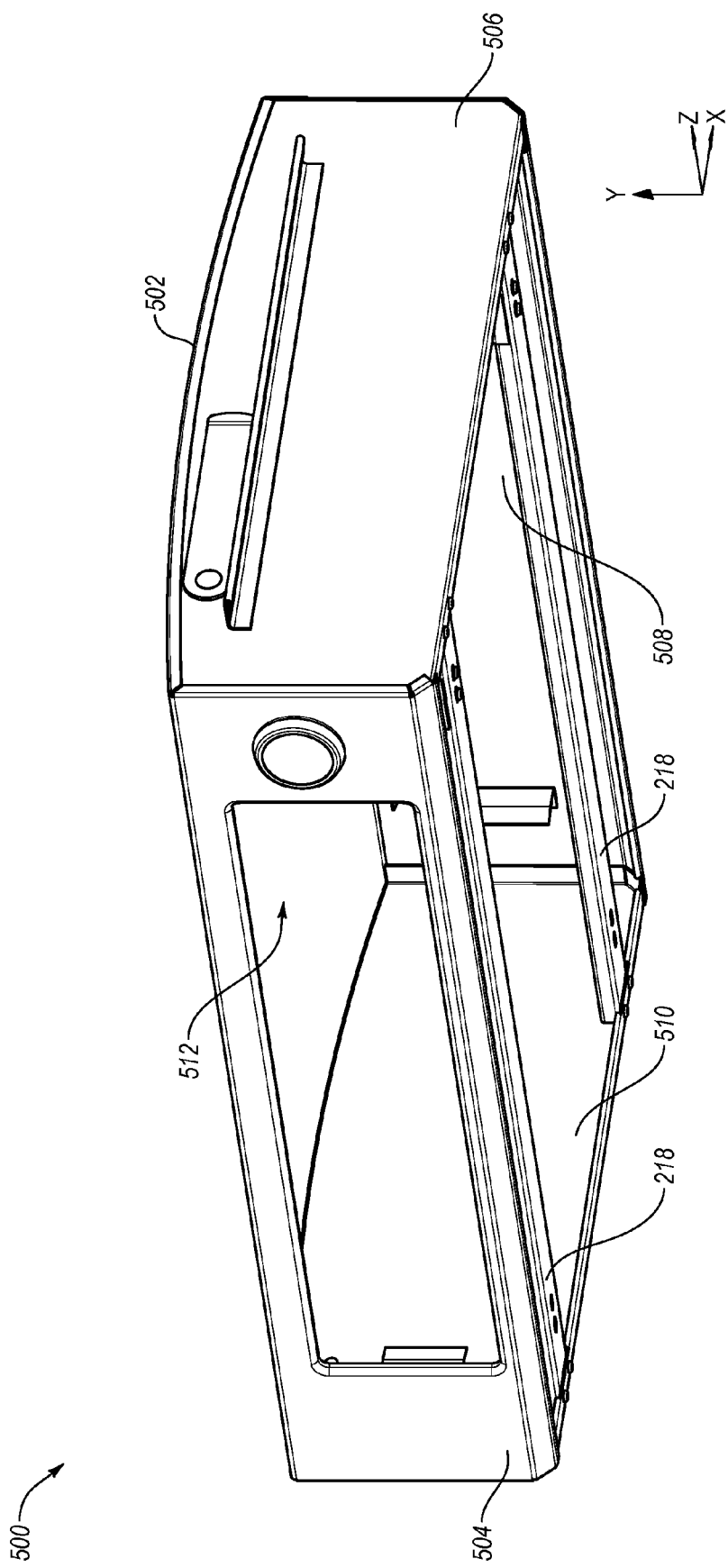
FIGS. 5A and 5B illustrate an example housing that may be implemented in the cooking device of FIGS. 2A-2C, all in accordance with at least one embodiment described herein.
Figure 5B:
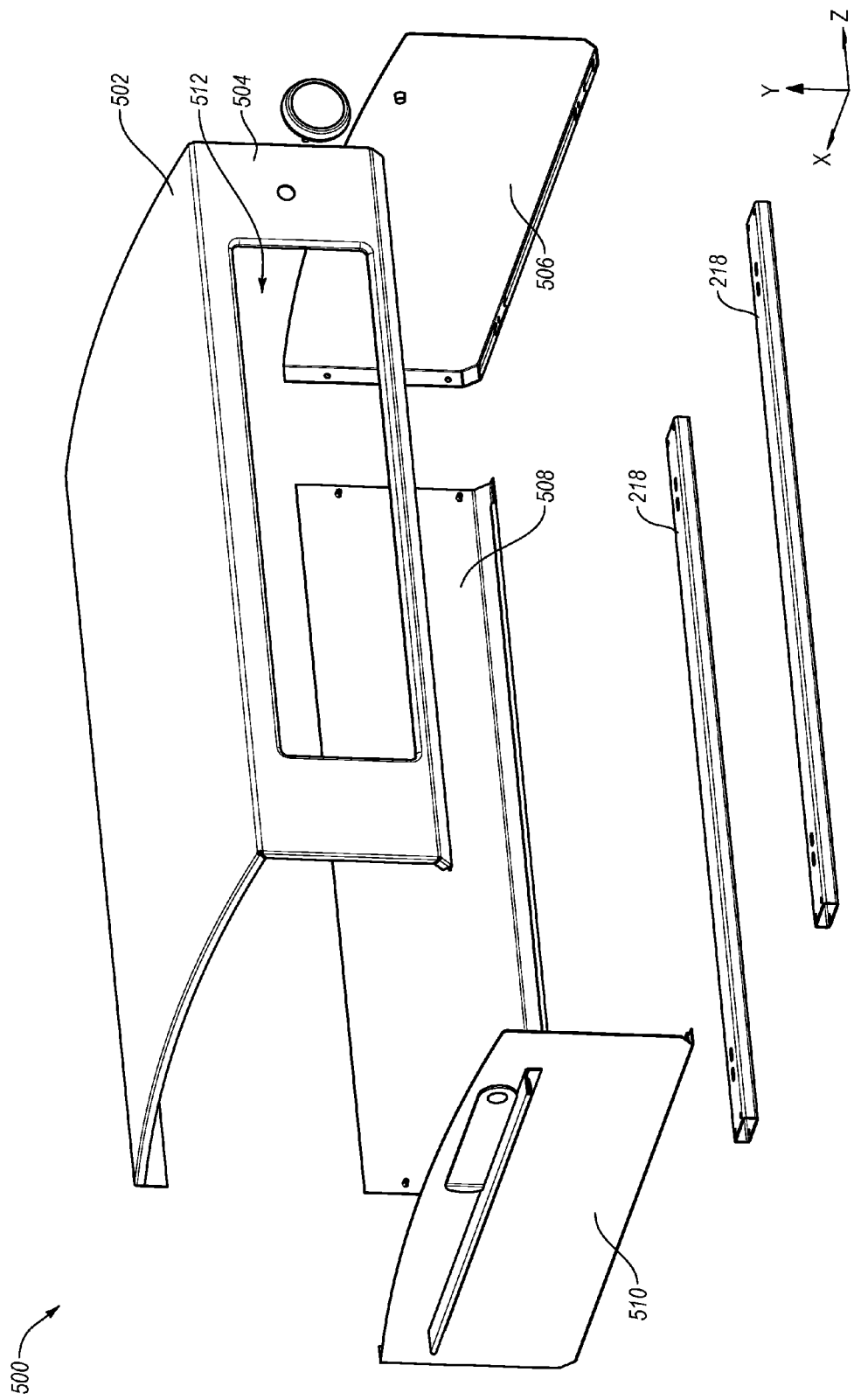

FIGS. 5A and 5B illustrate an example housing 500 that may be implemented in the cooking device 104 of FIGS. 2A-2C in accordance with at least one embodiment described herein. Specifically, FIG. 5A is a perspective view of the housing 500 and FIG. 5B is a partially exploded view of the housing 500. The housing 500 may be substantially similar to and/or correspond to the housing 206 of FIGS. 2A-3C. Accordingly, one or more components or features (e.g., 218) of the housing 206 may be included in the housing 500. Some details of these components and features are not repeated with reference to FIGS. 5A and 5B. As discussed above, the housing 500 may be configured to surround or partially surround a refractory oven such as the refractory oven 400 of FIGS. 4A-4C and/or the refractory oven 202 of FIGS. 2A-3C.

In this and other embodiments, the housing 500 may be composed of a metal. For example, the housing 500 may be composed of a carbon steel or an aluminum. In some alternative embodiments, the housing 500 or some portion thereof may be composed of a ceramic material. Additionally, some alternative embodiments may include a metallic housing 500 that is coated with insulation and/or includes insulative inserts that are attached or affixed to the metallic housing 500.

The housing 500 may include one or more panels 502, 504, 506, 508, and 510 that may be attached and/or formed as a single piece. In particular, in this and other embodiments, the housing 500 may include a front panel 504, a rear panel 508, two side panels 506 and 510, and a top cover 502. The top cover 502 and the front panel 504 may be formed as a single piece in this and other embodiments, and the rear panel 508 and the two side panels 506 and 510 may be attached to the top cover 502 and the front panel 504 using one or more fasteners. This configuration of the housing 500 is not limiting. For example, two or more of the panels 502, 504, 506, 508, and 510 may be formed as a single piece and/or attached to the remaining panels 502, 504, 506, 508, and 510 without limitation. Additionally, the panels 502, 504, 506, 508, and 510 may be attached to one another through any suitable means such as welding, adhering with adhesives, end rolling, etc.

In some embodiments, the front panel 504 may define a front panel opening 512. The front panel opening 512 may be configured to correspond to an opening defined in a refractory oven. For example, with combined reference to FIGS. 4B and 5A-5B, the front panel opening 512 may correspond to the opening 250 defined by the refractory oven 400. Additionally, in some embodiments, the front panel 504 may be positioned substantially adjacent to a front surface 424 of the refractory bottom piece 410, front surfaces 422 and 426 of the two refractory side pieces 408 and 412, and a front surface 420 of the refractory top piece 406.

Additionally, in these and other embodiments the rear panel 508 may be positioned substantially adjacent to the refractory rear piece 414, the two side panels 506 and 510 may be positioned a distance (e.g., the distance 228 of FIGS. 2A-3C) from the two refractory side pieces 408 and 412, and the top cover 502 may be positioned a second distance (e.g., the second distance 312 of FIGS. 3A-3C) from the external surface 212 of the refractory top piece 406. Thus, the housing 500 may surround the external surface 212 of the refractory top piece 406, the two refractory side pieces 408 and 412, and the refractory rear piece 414. The housing 500 combined with the refractory top piece 406, the two refractory side pieces 408 and 412, and the refractory rear piece 414, may define a heated volume (discussed above) that may be configured to reduce transfer of thermal energy from the cooking chamber through the refractory top piece 406, the two refractory side pieces 408 and 412, and the refractory rear piece 414.

In some embodiments, the two refractory side pieces 408 and 412 and the two side panels 506 and 510 may be substantially parallel when the refractory oven 400 is positioned inside the housing 500. In this and other embodiments, the refractory oven 400 and the housing 500 are generally rectangular. However, this is not meant to be limiting. In some embodiments, the refractory oven 400 and/or the housing 500 may be circular, oval, D-shaped, etc. In each of these embodiments, refractory side pieces of a refractory oven may be substantially parallel to the side panels of a housing.

Additionally, in this and other embodiments, the support braces 218 may be attached to the two side panels 506 and 510. The support braces 218 may additionally or alternatively be attached to any other of the panels 502, 504, 506, 508, and 510 or may be omitted in some embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cooking device comprising:
a refractory oven that includes a refractory top piece, two refractory side pieces, a refractory rear piece, and a refractory bottom piece, wherein:
the refractory bottom piece includes an internal surface and an external surface and contacts the two refractory side pieces,
the refractory rear piece is secured relative to the two refractory side pieces,
the refractory oven defines a cooking chamber configured to receive thermal energy from an external heat source that is adjacent to the external surface of the refractory bottom piece,
the refractory oven defines a vent between an end surface of the refractory bottom piece and the refractory rear piece, the vent being configured to enable transfer of convective thermal energy from the external heat source to the cooking chamber, and
the refractory oven further defines an opening opposite the refractory rear piece configured to allow foodstuffs to be introduced into the cooking chamber and to allow at least a portion of the convective thermal energy to exit the cooking chamber;
a housing that surrounds external surfaces of the refractory top piece, the two refractory side pieces, and the refractory rear piece when the refractory oven is positioned in the housing; and a heated volume defined between the external surfaces of the refractory top piece, the two refractory side pieces, and the refractory rear piece and an internal surface of the housing when the refractory oven is positioned in the housing, wherein the heated volume is configured to receive thermal energy from the external heat source and to reduce transfer of thermal energy from the cooking chamber.

2. The cooking device of claim 1, wherein:
the refractory oven includes an internal surface that is configured as a boundary of the cooking chamber; and
the refractory oven is configured to transfer thermal energy from the internal surface to the foodstuffs via thermal radiation during heating of the foodstuffs while positioned inside the cooking chamber.

3. The cooking device of claim 1, wherein the refractory oven includes a cooking surface on which the foodstuffs are positioned during cooking and which is configured to transfer thermal energy to the foodstuffs via thermal conduction.

4. The cooking device of claim 3, wherein:
the housing is comprised of steel or aluminum;
the refractory oven is comprised of Cordierite; and
the housing is configured to define the heated volume such that when the cooking surface is at a temperature between 600 degrees Fahrenheit and 1100 degrees Fahrenheit, a temperature gradient within the cooking chamber is maintained between 75% and 100% of the temperature of the cooking surface.

5. A cooking device of claim 1, wherein the external heat source includes a charcoal grill, a wood grill, a natural gas grill, or a propane grill.

6. A cooking device comprising:
a refractory oven that defines a cooking chamber with an internal surface and an external surface, wherein the refractory oven includes a refractory top piece, two refractory side pieces, a refractory bottom piece, and a refractory rear piece
wherein:
the refractory bottom piece includes a cooking surface and a heating surface positioned opposite the cooking surface;
the refractory bottom piece contacts the two refractory side pieces;
the refractory rear piece is secured relative to the two refractory side pieces;
the heating surface of the refractory bottom piece is configured to be positioned adjacent to an external heat source to receive thermal energy from the external heat source;
the refractory oven defines a vent between an end surface of the refractory bottom piece and the refractory rear piece, the vent being configured to enable transfer of at least a portion of convective thermal energy from the external heat source to the cooking chamber, and
the refractory oven further defines an opening opposite the refractory rear piece that is configured to allow foodstuffs to be introduced into the cooking chamber and to allow the convective thermal energy to exit the cooking chamber;
a housing including an internal surface, wherein the housing surrounds external surfaces of the refractory top piece, the two refractory side pieces, and the refractory rear piece when the refractory oven is positioned within the housing; and
a volume defined between the external surfaces of the refractory top piece, the two refractory side pieces, and the refractory rear piece and the internal surface of the housing, wherein the volume is configured to receive thermal energy from the external heat source.

7. The cooking device of claim 6, wherein:
the refractory bottom piece is configured to absorb a first portion of the thermal energy received from the external heat source and to transfer the first portion of the thermal energy to foodstuffs in contact with the cooking surface of the refractory bottom piece via thermal conduction;
the refractory oven is configured to absorb a second portion of the thermal energy received from the external heat source and to transfer the second portion of the thermal energy to the foodstuffs via thermal radiation;
the refractory bottom piece and the refractory oven define a vent and an opening;
the vent is configured to receive a third portion of the thermal energy from the external heat source into the cooking chamber and to transfer the third portion of the thermal energy to the foodstuffs or to the refractory oven via thermal convection; and
the opening is configured to allow the third portion of the thermal energy to exit the cooking chamber.

8. The cooking device of claim 6, wherein:
the refractory bottom piece, the two refractory side pieces, the refractory rear piece, and the refractory top piece are substantially rectangular.

9. The cooking device of claim 6, wherein:
the housing further includes a front panel, a rear panel, and two side panels;
the front panel defines a front panel opening that corresponds to the opening;
the front panel is adjacent to front surfaces of the refractory bottom piece, the two refractory side pieces, and the refractory top piece;
the rear panel is adjacent to the refractory rear piece;
the two side panels are positioned apart from the refractory side pieces; and
the volume is configured to receive thermal energy from areas between the side panels and the refractory side pieces.

10. The cooking device of claim 9, wherein:
the two side panels are oriented substantially parallel to the refractory side pieces, and
the housing includes a top cover positioned apart from an external surface of the refractory top piece.

11. The cooking device of claim 10, wherein:
the housing is comprised of steel or aluminum;
the refractory oven is comprised of Cordierite; and
the housing is configured to define the volume such that when the cooking surface is at a temperature between 600 degrees Fahrenheit and 1100 degrees Fahrenheit, a temperature gradient within the cooking chamber is maintained between 75% and 100% of the temperature of the cooking surface.

12. The cooking device of claim 6, wherein one or more of the refractory oven and the refractory bottom piece include Cordierite.

13. A cooking apparatus comprising:
a cooking chamber that is constructed of a refractory top piece; two refractory side pieces; a refractory rear piece; and a refractory bottom piece that includes an internal surface and an external surface, wherein:
the refractory rear piece is secured relative to the two refractory side pieces,
the refractory bottom piece contacts the two refractory side pieces, and the cooking chamber is configured to receive thermal energy from an external heat source that is positioned adjacent to the external surface of the refractory bottom piece;

a vent defined between an end surface of the refractory bottom piece and the refractory rear piece, the vent being configured to enable transfer of convective thermal energy from the external heat source to the cooking chamber;

an opening defined opposite the refractory rear piece, the opening being configured to enable introduction and removal of foodstuffs from the cooking chamber and to allow at least a portion of the convective thermal energy to exit the cooking chamber;

a housing that surrounds external surfaces of the refractory top piece, the two refractory side pieces, and the refractory rear piece; and a heated volume defined between the external surfaces of the refractory top piece, the two refractory side pieces, and the refractory rear piece and an internal surface of the housing, the heated volume being configured to receive thermal energy from the external heat source and to reduce transfer of thermal energy from the cooking chamber through the refractory top piece, the two refractory side pieces, and the refractory rear piece.

14. The cooking apparatus of claim 13, wherein:

the refractory bottom piece is configured to absorb a first portion of the thermal energy received from the external heat source and to transfer the first portion of the thermal energy to foodstuffs in contact with the refractory bottom piece via thermal conduction;

the refractory top piece, the two refractory side pieces, and the refractory rear piece are configured to absorb a second portion of the thermal energy received from the external heat source and to transfer the second portion of the thermal energy to the foodstuffs via thermal radiation;

the vent is configured to receive a third portion of the thermal energy from the external heat source into the cooking chamber and to transfer the third portion of the thermal energy to the foodstuffs or to the refractory top piece, the two refractory side pieces, the refractory rear piece, and the refractory bottom piece via thermal convection; and the opening is configured to allow the third portion of the thermal energy to exit the cooking chamber.

15. The cooking apparatus of claim 13, wherein the housing includes:

a front panel defining a front panel opening that corresponds to the opening, the front panel being adjacent to front surfaces of the refractory bottom piece, the two refractory side pieces, and the refractory top piece;

a rear panel adjacent to the refractory rear piece;

two side panels positioned apart from the two refractory side pieces, which create two side areas between the two side panels and the two refractory side pieces; and a top cover positioned apart from the external surface of the refractory top piece, wherein the heated volume is configured to receive thermal energy from areas beneath the side areas.

16. The cooking apparatus of claim 13, wherein the external heat source includes a grilling surface and a lid, the cooking apparatus being configured to be positioned on the grilling surface with the lid placed in a closed position or partially closed position over the cooking apparatus.

17. The cooking device of claim 1, wherein the housing includes:

side portions that when the refractory oven is positioned in the housing and centered therein are apart from the refractory side pieces such that two side sub-volumes are defined between the side portions and the refractory side pieces;

a top portion that when the refractory oven is positioned in the housing and centered therein is apart from the refractory top piece such that a top sub-volume is defined between the refractory top piece and the top portion; and the heated volume includes the two side sub-volumes and the top sub-volume.

18. The cooking device of claim 17, wherein the housing includes a front panel that defines a front panel opening, wherein the front panel opening corresponds to the opening defined by a refractory oven and positioned substantially adjacent to a front surface of the refractory bottom piece, front surfaces of the two refractory side pieces, and a front surface of the refractory top piece.

* * * * *